Feb. 4, 1964
D. W. SHERMAN
3,120,294
BRAKING SYSTEM
Filed Nov. 6, 1961
3 Sheets-Sheet 1
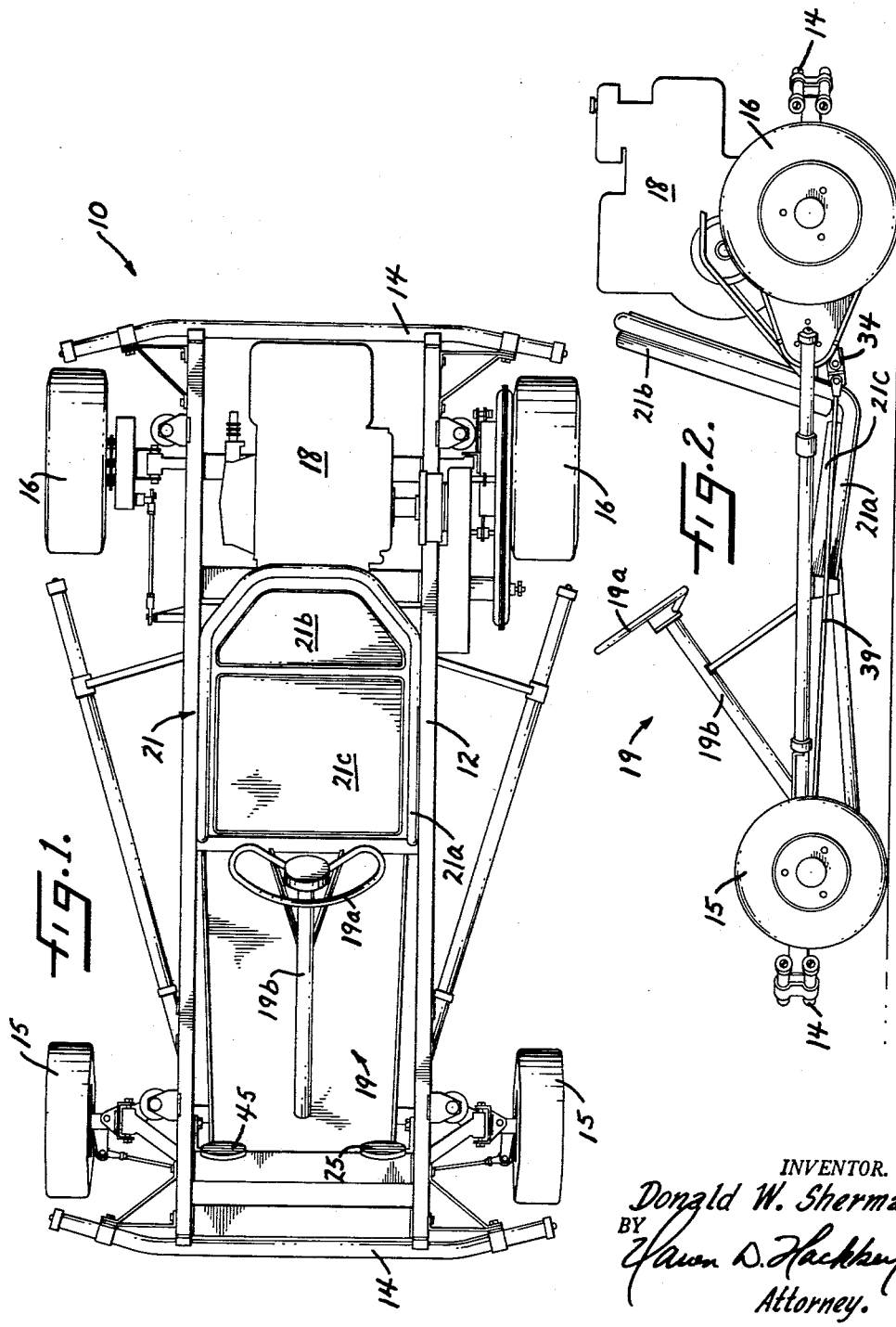
INVENTOR.
Donald W. Sherman,
BY
Attorney.

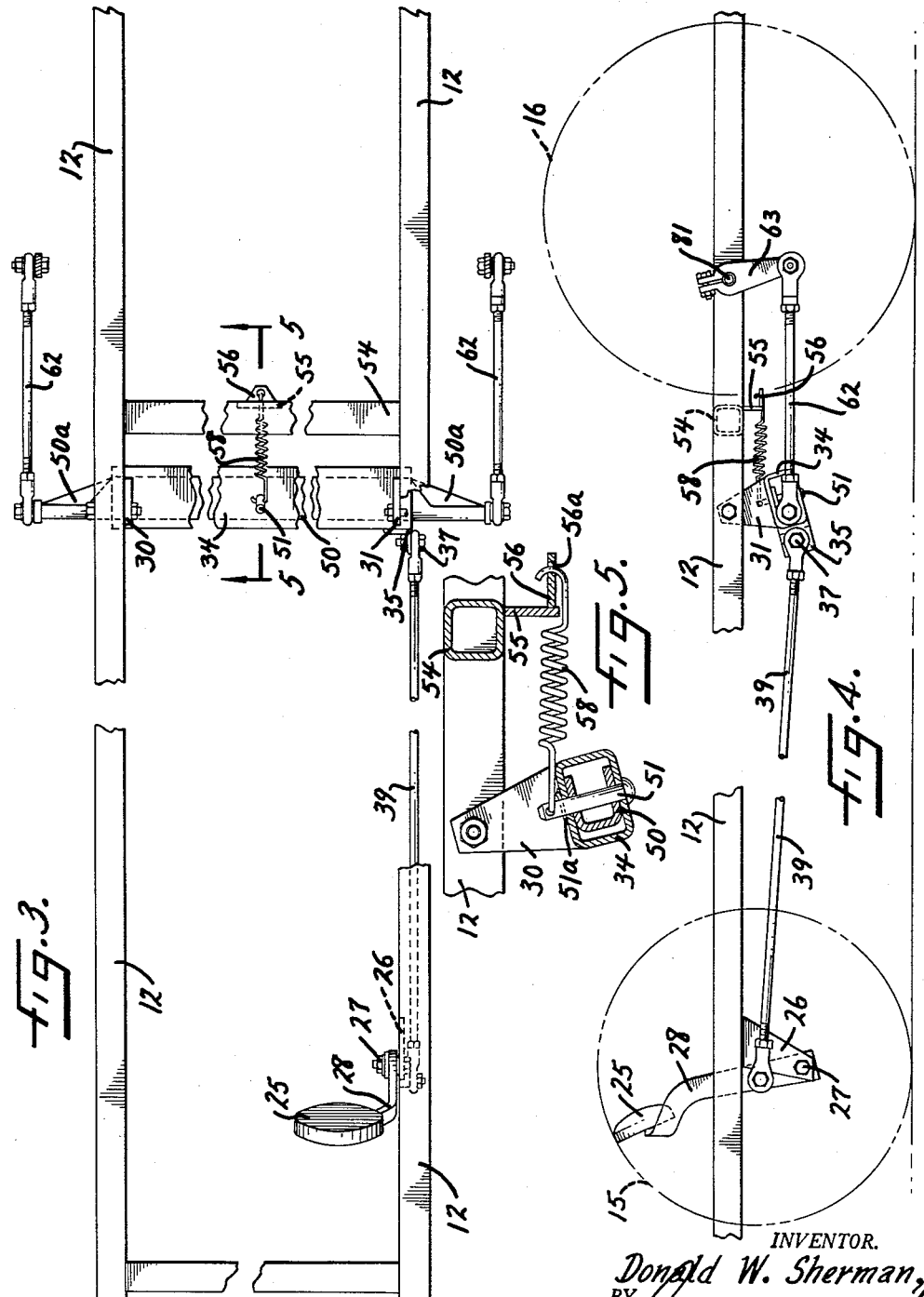

Feb. 4, 1964 D. W. SHERMAN 3,120,294
BRAKING SYSTEM
Filed Nov. 6, 1961 3 Sheets-Sheet 3
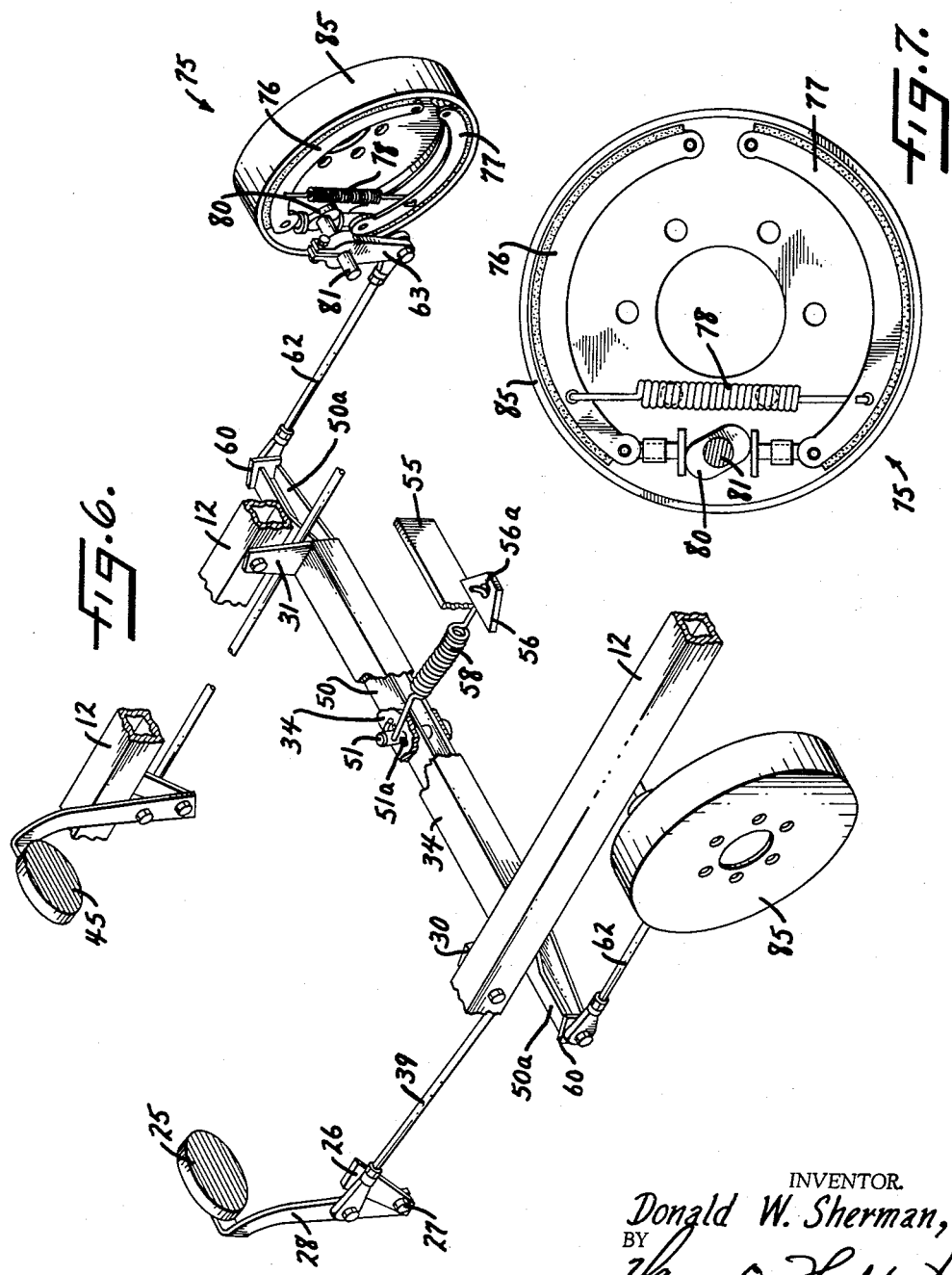
INVENTOR.
Donald W. Sherman,
BY
Attorney.

United States Patent Office 3,120,294
Patented Feb. 4, 1964

3,120,294
BRAKING SYSTEM
Donald W. Sherman, Milwaukee, Wis., assignor, by mesne assignments, to Griffin and Orr, Evansville, Ind., a general partnership
Filed Nov. 6, 1961, Ser. No. 150,397
9 Claims. (Cl. 188—204)

The present invention relates to a braking system, and more particularly to a new and novel braking system having particular adaptability for use in the automotive area, as, for example, on karts.

With the increasing popularity of the aforesaid karts, either on concession tracks or for racing, for example, it has become necessary to provide a braking system which not only affords maximum positive braking action, but which also provides equal braking pressure for each of the braked wheels. The preceding, is of course, desirable as a measure of safety control, in that if unequal pressures are exerted during braking action, the kart has a tendency to swerve either in one direction or the other, with such swerving oftentimes resulting in accidents, as well as injury to the driver of the kart.

By virtue of the instant invention, the applicant has provided an improved braking system for a vehicle which has a new and novel pressure-equalizing linkage arrangement which effectively contributes to the optimum control of the kart during its use. Briefly, the instant invention is accomplished through the use of a cross member which is pivotal in a forwardly direction in response to movement of a brake pedal by the driver, where such cross member has a channel member pivotally mounted therewithin. The aforesaid channel member has connections at its free ends to conventional dual brake mechanism typically operable in combination with the wheels of the kart. When in use, as the cross member moves forwardly, the channel member pivots and, accordingly, affords equalization of the pressures exerted against the brake drums of the brake mechanisms.

Accordingly, the principal object of the present invention is to provide a new and novel braking system for a vehicle.

Another object of the present invention is to provide an improved braking system for a vehicle which includes a new and novel pressure-equalizing linkage arrangement for affording positive braking action.

A further and more general object of the present invention is to provide self-adjusting dual brakes for a vehicle, whereby, through the use of a pressure-equalizing linkage arrangement having a minimum number of components, maximum and uniform braking action, and, hence, better control is provided.

Other objects and a better understanding of the present invention will become more apparent from the following description, taken in conjunction with the following drawings, wherein:

FIG. 1 is a top plan view of a kart utilizing the new and novel braking system forming the instant invention;

FIG. 2 is a view in side elevation of the kart of FIG. 1;

FIG. 3 is a top plan view, partly fragmentary, showing details of the instant braking system;

FIG. 4 is a view in side elevation, partly fragmentary and generally corresponding to the view of FIG. 3, showing further details of the applicant's invention;

FIG. 5 is an enlarged view in vertical cross section, partly fragmentary, taken in line 5—5 of FIG. 3 and looking in the direction of the arrows, showing details of the arrangement for urging the braking system towards a non-braking position;

FIG. 6 is a perspective view of the instant braking system, showing typical brake mechanisms used in combination therewith; and, FIG. 7 is a view in side elevation showing the details of one of the typical brake mechanisms of FIG. 6.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 and 2, a conventional kart 10 is disclosed which typically comprises a frame 12 having bumpers 14 secured at opposite ends thereof; supporting front and rear wheels 15 and 16, respectively; an engine 18, with associated mechanism for driving wheels 16; a steering arrangement 19, including a steering wheel 19a mounted on a steering column 19b; a seat 21 for the driver, where the latter is typically formed on a tubular frame 21a which has a back portion 21b and a seat portion 21c; and, pedals 25 and 45 which, respectively, are used by the driver to control braking (to be discussed more fully herebelow) and the throttling of the engine 18. Inasmuch as the instant invention is directed to a new and novel braking system for a kart having the aforesaid components, a detailed discussion of such components is not considered necessary, except, to broadly state that the instant design provides maximum strength, as well as a high factor of safety.

Referring now to FIGS. 3, 4, 5 and 6, the applicant's invention is shown in connection with the aforediscussed kart 10 where, on the frame 12, which is typically square steel tubing, a depending plate 26 is mounted, as by welding, for example. The plate 26 has a pivot 27 at its lower end, which pivot 27 receives an arm 28 to which the brake pedal 25 is secured. As should be apparent from the drawings, the brake pedal arrangement is so disposed as to provide convenient and positive access to the driver.

Other depending plates 30 and 31 are pivotally mounted on the inner sides of the frame 12 and towards the rear portion thereof. A cross member 34 is secured to the plates 30 and 31, as by welding, for example, where such cross member 34 typically has a flange 35 welded thereto (see FIGS. 3 and 4). As should be apparent from the drawings, cross member 34 is typically hollow in cross section.

A nut and bolt combination 37 is adapted to extend, in a pivotal relationship, through a portion of the flange 35 and through one end of a brake rod 39, where the other, or forward, end of the latter is pivotally connected to the arm 28 which has the brake pedal 25 secured thereto. In any event, it should be apparent that as pressure is exerted upon the brake pedal 25, the arm 28 pivots at 27, causing the brake rod 39 to move forwardly and, hence, the cross member 34 to pivot with plates 30 and 31. It should be understood that the aforesaid pivotal action of the cross member 34 is in a longitudinal direction with respect to the kart.

Disposed within the cross member 34 is a channel member 50 which, typically, has tapered or cut-out free end portions 50a. The channel member 50 pivots at an axis defined by a bolt 51, where the latter is positioned on the cross member 34 by a retaining clip 51a. A cross frame 54 is disposed rearwardly of the aforedescribed cross member 34 having the channel member 50 disposed therewithin, and such cross frame 54 has a generally vertically extending plate 55 secured thereto. Another plate 56 extends outwardly in a rearwardly direction from plate 55, and an opening 56a disposed therein is adapted to receive the free end of a spring 58, the other end of the latter being adapted to be received in an opening near the top of the bolt 51.

It should be understood from the drawings that the spring 58 serves to urge the cross member 34 in a rearwardly direction, i.e. towards the rear of the kart. Restated otherwise, the spring 58 serves to urge the overall braking system into a nonoperative or nonbraking position, and, thus, acts against the force applied to the brake pedal 25 by the driver.

With further reference to FIG. 6, the free end portions 50a of the channel member 50 typically have plates 60 secured thereto, where such plates 60 provide pivotal connections to brake control rods 62, the latter each being pivotally connected to a clamping member 63. With reference now to FIG. 7, the brake mechanism 75, of which there are two, for the system is conventional in form, being defined as having brake shoes 76 and 77 urged together by a spring 78, whereupon a cam 80, operable through a rod 81 to which each of the respective clamping members 63 are secured, moves the brake shoes 76 and 77 into braking engagement with the inside surface of a brake drum 85. As should be apparent from the drawings, the braked wheels are on the rear of the kart 10, where the aforestated dual brake mechanisms 75 are employed in combination therewith.

In use, the driver forces the brake pedal 25 forwardly, which, as discussed hereabove, causes the cross member 34 to move forwardly through movement of the brake rod 39. Pressure-equalization is achieved through the pivoting of the channel member 50 within the cross member 34 at bolt 51, where such pivotal movement equalizes the force transmitted to the respective brake mechanisms 75, bearing in mind that the movement of the cross member 34 in the forwardly direction is positive and controlled between the sides of the frame 12. Conversely, when the driver releases the brake pedal 25, i.e. removes his foot therefrom, the spring 58 urges the cross member 34 rearwardly and, hence, braking is no longer achieved, i.e. the brake shoes 76 and 77 are disengaged from their respective brake drums 85 because of the rotation of cam 80 to the position of FIG. 7.

From the preceding description, it should be apparent that the applicant has provided a new and novel braking system for a vehicle, such as the commonly known kart. The applicant's invention contributes the important advantage of pressure-equalized braking during the use thereof, where such is accomplished through a minimum number of components which combine to provide highly effective action, as well as an excellent factor to safety.

The braking system described hereabove is susceptible to various changes within the spirit of the invention. By way of example, changes in dimensions and component form from those described hereabove and shown in the drawings may be made without sacrificing any of the advantages afforded by the invention. Thus, the preceding description should be considered illustrative, and not as limiting the scope of the following claims.

I claim:

1. In a braking system having a control means and brake mechanisms, and a supporting frame, a first member pivotally mounted on said supporting frame and movably responsive to said control means, said first member having pivotal mounting means disposed thereon, and a second member pivotally disposed within said first member on said pivotal mounting means, said second member connecting to said brake mechanisms and pivotal in a lateral plane with respect to said first member.

2. In a braking system having a control means and brake mechanisms, and a supporting frame, a first member pivotally mounted on said frame and responsive to movement of said control means, said first member having pivotal mounting means disposed thereon, a control member mounted within said first member on said pivotal mounting means, and pivotal in a lateral plane with respect thereto, and connecting members secured to said control member and to said brake mechanisms, where the latter are operably responsive to movement of said first member and of said control member.

3. A braking system for a vehicle having a frame comprising, in combination, a control means pivotally mounted on said frame, a cross member pivotally mounted on said frame and having pivotal mounting means thereon, a first connecting member disposed between said control means and said cross member whereby the latter is operably responsive to movement of said control means, a control member mounted within said cross member on said pivotal mounting means and pivotal in a lateral plane with respect thereto, brake mechanisms connecting to said control member through second connecting members, and means secured to said frame and connecting said braking system urging the latter into a nonoperative position.

4. A braking system for a vehicle having a framework comprising, in combination, a cross member pivotally mounted on said framework and having pivotal mounting means thereon, a control means mounted on said framework serving to move said cross member from a first position to a second position, a control member mounted within said cross member on said pivotal mounting means and pivotal in a lateral plane with respect thereto, brake mechanisms connecting said control member through connecting members, and means urging said cross member to said first position.

5. A braking system for a vehicle having a frame comprising, in combination, a control means pivotally mounted on said frame, a cross member pivotally mounted on said frame and having pivotal mounting means thereon, a first connecting member disposed between said control means and said cross member whereby the latter is operably responsive to movement of said control means, a control member mounted within said cross member on said pivotal mounting means and pivotal in a lateral plane with respect thereto, and brake mechanisms connecting to said control member through second connecting members.

6. The braking system of claim 5 where said second connecting members connect to said control member at points equidistant from its point of lateral pivotal movement.

7. The braking system of claim 6 where said control member pivots at the mid-point of said cross member.

8. A braking system for a vehicle having a framework comprising, in combination, a cross member mounted on said framework and pivotal longitudinally with respect to said vehicle, said cross member having pivotal mounting means disposed thereon, a control means mounted on said framework serving to move said cross member from a first position to a second position, a control member mounted within said cross member on said pivotal mounting means and pivotal in a lateral plane with respect thereto, and brake mechanisms connecting said control member through connecting members.

9. A braking mechanism for a vehicle having a framework comprising, in combination, a cross member pivotally mounted on said framework, said cross member having pivotal mounting means disposed thereon, a control means mounted on said framework serving to move said cross member from a first position to a second position, a control member mounted on said cross member on said pivotal mounting means and pivotal in a lateral plane with respect thereto, means forming part of said cross member limiting the pivotal movement of said control member, brake mechanisms connecting said control member through connecting members, and means urging said cross member to said first position.

References Cited in the file of this patent

UNITED STATES PATENTS

| | | |
|---|---|---|
| 645,158 | Windle | Mar. 13, 1900 |
| 1,076,100 | Conover | Oct. 21, 1913 |
| 1,395,540 | Ward | Nov. 1, 1921 |
| 1,847,914 | Ashton | Mar. 1, 1932 |
| 2,113,435 | Sparrowhawk | Apr. 5, 1938 |
| 2,191,821 | Down | Feb. 27, 1940 |